United States Patent
Tran et al.

(10) Patent No.: US 7,065,723 B2
(45) Date of Patent: Jun. 20, 2006

(54) DEFECT TRACKING BY UTILIZING REAL-TIME COUNTERS IN NETWORK COMPUTING ENVIRONMENTS

(75) Inventors: Trung M. Tran, Round Rock, TX (US); Sze Tom, Austin, TX (US); Alan C. Folta, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 111 days.

(21) Appl. No.: 10/255,800

(22) Filed: Sep. 25, 2002

(65) Prior Publication Data

US 2004/0060018 A1    Mar. 25, 2004

(51) Int. Cl.
 *G06F 17/50* (2006.01)
 *G06F 11/00* (2006.01)
 *G01R 31/02* (2006.01)
(52) U.S. Cl. ............................ 716/4; 716/5; 324/537; 714/25
(58) Field of Classification Search ............... 716/4–5; 714/25, 42, 725; 324/73.1, 537, 718
See application file for complete search history.

(56) References Cited

U.S. PATENT DOCUMENTS

| | | | | |
|---|---|---|---|---|
| 4,855,670 A | * | 8/1989 | Green | 324/73.1 |
| 5,682,472 A | * | 10/1997 | Brehm et al. | 714/25 |
| 5,835,601 A | * | 11/1998 | Shimbo et al. | 713/165 |
| 6,466,978 B1 | * | 10/2002 | Mukherjee et al. | 709/225 |
| 6,539,506 B1 | * | 3/2003 | Lammers et al. | 714/719 |
| 6,549,996 B1 | * | 4/2003 | Manry et al. | 711/203 |

* cited by examiner

*Primary Examiner*—Paul Dinh
(74) *Attorney, Agent, or Firm*—Blakely, Sokoloff, Taylor & Zafman LLP

(57) ABSTRACT

Disclosed are novel methods and apparatus for manipulating and generating a real-time counter in network computing environments. In an embodiment, a method of tracking a defect is disclosed. The method includes providing a defect abstract, the defect abstract including information to identify the defect; identifying a component having the defect; assigning a user to resolve the defect; and assigning a defect number to identify the defect, the defect number obtained by incrementing a counter value stored in a file, the file being accessible by a single user at a time.

20 Claims, 5 Drawing Sheets

Fig. 4

DEFECT TRACKING BY UTILIZING REAL-TIME COUNTERS IN NETWORK COMPUTING ENVIRONMENTS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright © 2002, Sun Microsystems, Inc., All Rights Reserved.

FIELD OF INVENTION

The present invention generally relates to the field of real-time counters. More specifically, an embodiment of the present invention provides a method of manipulating and generating a real-time counter in network computing environments.

BACKGROUND OF INVENTION

FIG. 1 illustrates an exemplarily flow diagram of a typical design process 100 for ICs in accordance with the prior art. The process can be generally divided into a front end design phase and a back end development phase. During the front end phase, an engineer designs and develops a logical representation of an integrated circuit (IC) from a set of specifications in form of a schematic (stage 102). At a stage 104, the schematic is then loaded into a computer from which a circuit netlist is generated. The netlist defines the entire IC design including all components and interconnections.

Moreover, the IC information may be developed using hardware description language (HDL) and synthesis. With the aid of circuit simulation tools available on computers, a designer can then simulate the functionality of a given circuit at a stage 106. The circuit simulation process may involve several iterations of design modifications and improvements, until the circuit design is finalized at a stage 108.

The back end development involves several stages during which a final circuit layout (physical description) is developed based on the schematic design of the front end. In a stage 110, various building blocks (or cells), as defined by the finalized circuit schematic, are placed within a predefined floor plan. For ICs designed based on array or standard cell technology, the various building circuit blocks are typically predefined and made available in a cell library. For example, during the stage 110, a plurality of cells are selected from one or more cell libraries and the cell interconnects are determined. More particularly, groups of cells may be interconnected to function as a flip-flop, shift registers, and the like. The routing of wires to interconnect the cells and achieve the aforementioned goals is preformed during a routing stage 112, typically referred to as conducting paths, wires or nets. Accordingly, in the stage 112, interconnects between circuit elements are routed throughout the layout. In a stage 114, the accuracy of the layout is verified against the schematic and if no errors or design rule violations are found at a stage 116, the circuit layout information is used for the process of fabrication in a stage 118.

As discussed with respect to FIG. 1, a typical IC design can involve a number of complicated steps. For example, defection and tracking are extremely important to the success of the process 100 of FIG. 1. As the number of modules within each IC design increases, for example, to provide additional functionality required by today's demands, tracking defects becomes an ever-increasingly important part of the IC design process. Also, as the number of defects increases in the more complicated designs, ensuring that a defect is tracked properly becomes even more essential.

SUMMARY OF INVENTION

The present invention, which may be implemented utilizing a general-purpose digital computer, in various embodiments, includes novel methods and apparatus to manipulate and generate a real-time counter in network computing environments. In an embodiment, a method of tracking a defect is disclosed. The method includes providing a defect abstract, the defect abstract including information to identify the defect; identifying a component having the defect; assigning a user to resolve the defect; and assigning a defect number to identify the defect, the defect number obtained by incrementing a counter value stored in a file, the file being accessible by a single user at a time.

In another embodiment, the file may be replicated on a different computer system to ensure reliability.

In a further embodiment, the component with the defect may be an IC component.

BRIEF DESCRIPTION OF DRAWINGS

The present invention may be better understood and its numerous objects, features, and advantages made apparent to those skilled in the art by reference to the accompanying drawings in which:

FIG. 4 illustrates an exemplarily tool 400 in accordance with an embodiment of the present invention.

The use of the same reference symbols in different drawings indicates similar or identical items.

DETAILED DESCRIPTION

In the following description, numerous details are set forth. It will be apparent, however, to one skilled in the art that embodiments of the invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" means that a particular feature, structure, or characteristic described in connection with the embodiment is included in at least an embodiment of the invention. The appearances of the phrase "in one embodiment" in various places in the specification are not necessarily all referring to the same embodiment.

In addition, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Moreover, embodiments of the present invention may be provided as computer program products, which may include machine-readable medium having stored thereon instructions used to program a computer (or other electronic devices) to perform a process according to embodiments of the present invention. The machine-readable medium may include, but is not limited to, floppy diskettes, optical disks, compact disc-read only memories (CD-ROMs), and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data.

Additionally, embodiments of the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Figure 1:
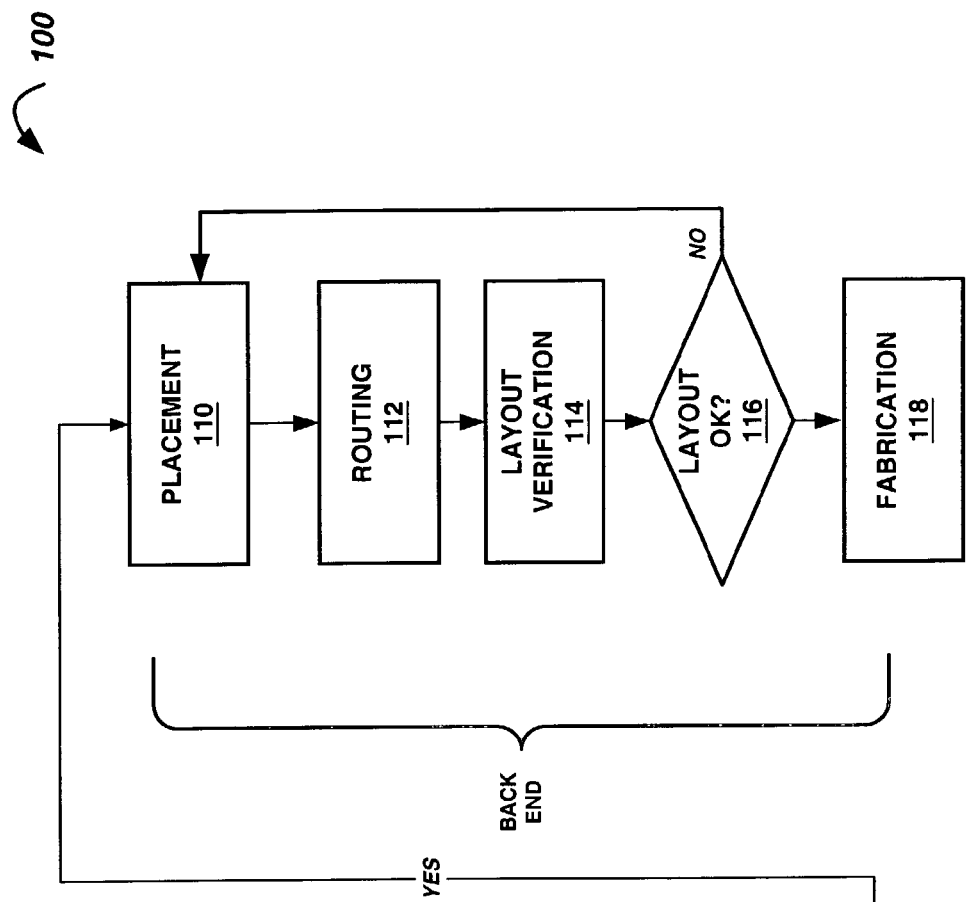
FIG. 1 illustrates an exemplarily flow diagram of a typical design process 100 for ICs in accordance with the prior art.
Figure 1:
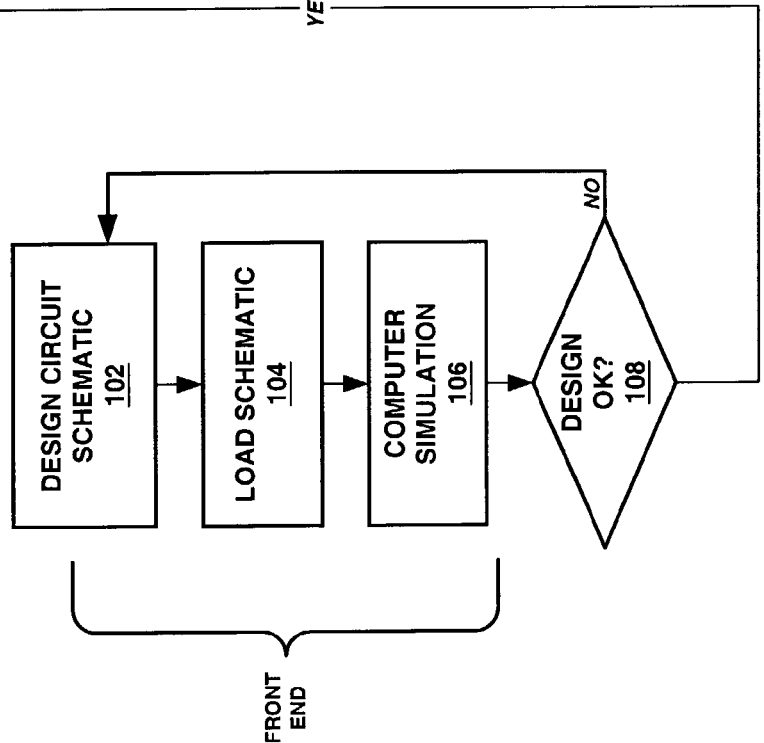
Figure 2:
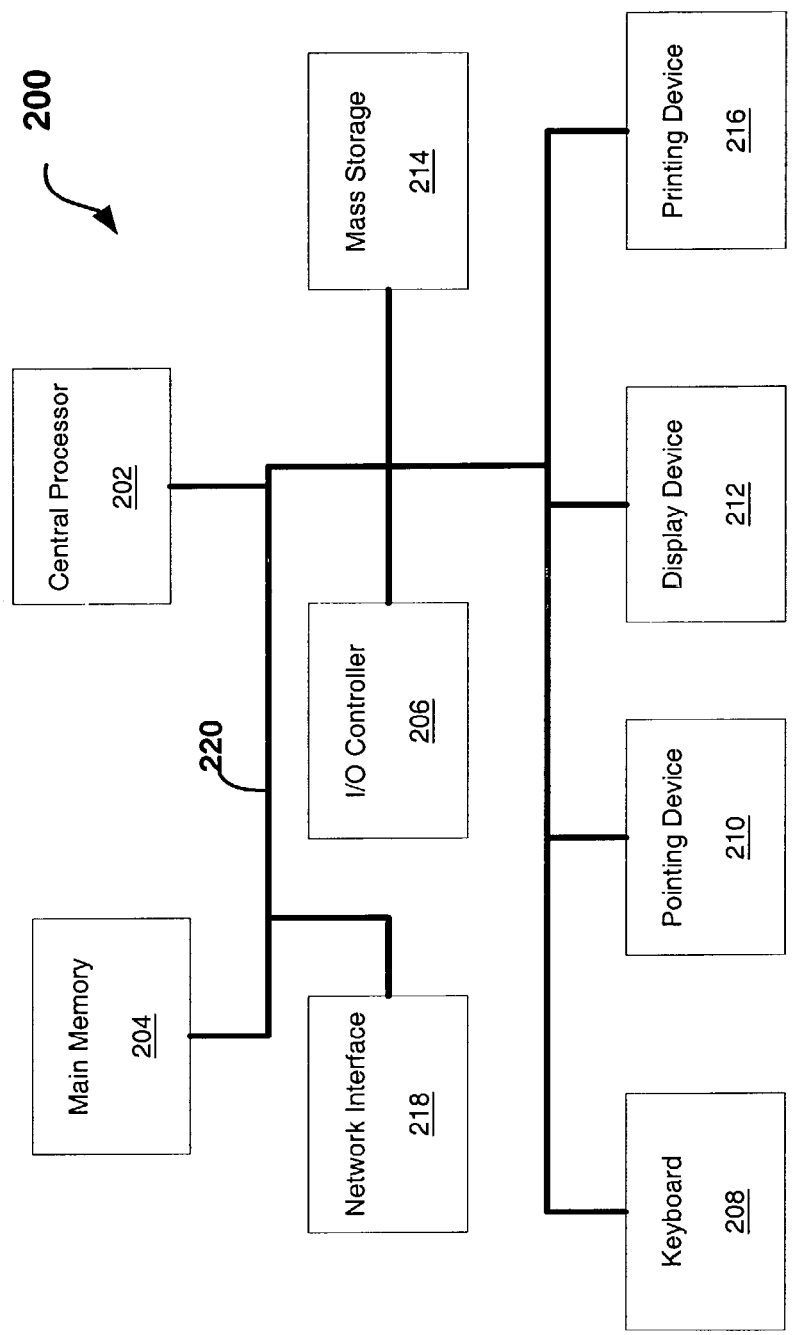
FIG. 2 illustrates an exemplary computer system 200 in which the present invention may be embodied.

FIG. 2 illustrates an exemplary computer system 200 in which the present invention may be embodied in certain embodiments. The system 200 comprises a central processor 202, a main memory 204, an input/output (I/O) controller 206, a keyboard 208, a pointing device 210 (e.g., mouse, track ball, pen device, or the like), a display device 212, a mass storage 214 (e.g., a nonvolatile storage such as a hard disk, an optical drive, and the like), and a network interface 218. Additional input/output devices, such as a printing device 216, may be included in the system 200 as desired. As illustrated, the various components of the system 200 communicate through a system bus 220 or similar architecture.

In an embodiment, the computer system 200 includes a Sun Microsystems computer utilizing a SPARC microprocessor available from several vendors (including Sun Microsystems of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). In addition, instead of a single processor, two or more processors (whether on a single chip or on separate chips) can be utilized to provide speedup in operations. It is further envisioned that the processor 202 may be a complex instruction set computer (CISC) microprocessor, a reduced instruction set computing (RISC) microprocessor, a very long instruction word (VLIW) microprocessor, a processor implementing a combination of instruction sets, and the like.

The network interface 218 provides communication capability with other computer systems on a same local network, on a different network connected via modems and the like to the present network, or to other computers across the Internet. In various embodiments, the network interface 218 can be implemented utilizing technologies including, but not limited to, Ethernet, Fast Ethernet, wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, time division multiplexing (TDM), universal serial bus (USB and its varieties such as USB II), asynchronous transfer mode (ATM), satellite, cable modem, and/or FireWire.

Moreover, the computer system 200 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), and the like. Also, it is envisioned that in certain embodiments, the computer system 200 is a general purpose computer capable of running any number of applications such as those available from companies including Oracle, Siebel, Unisys, Microsoft, and the like.

Figure 3:
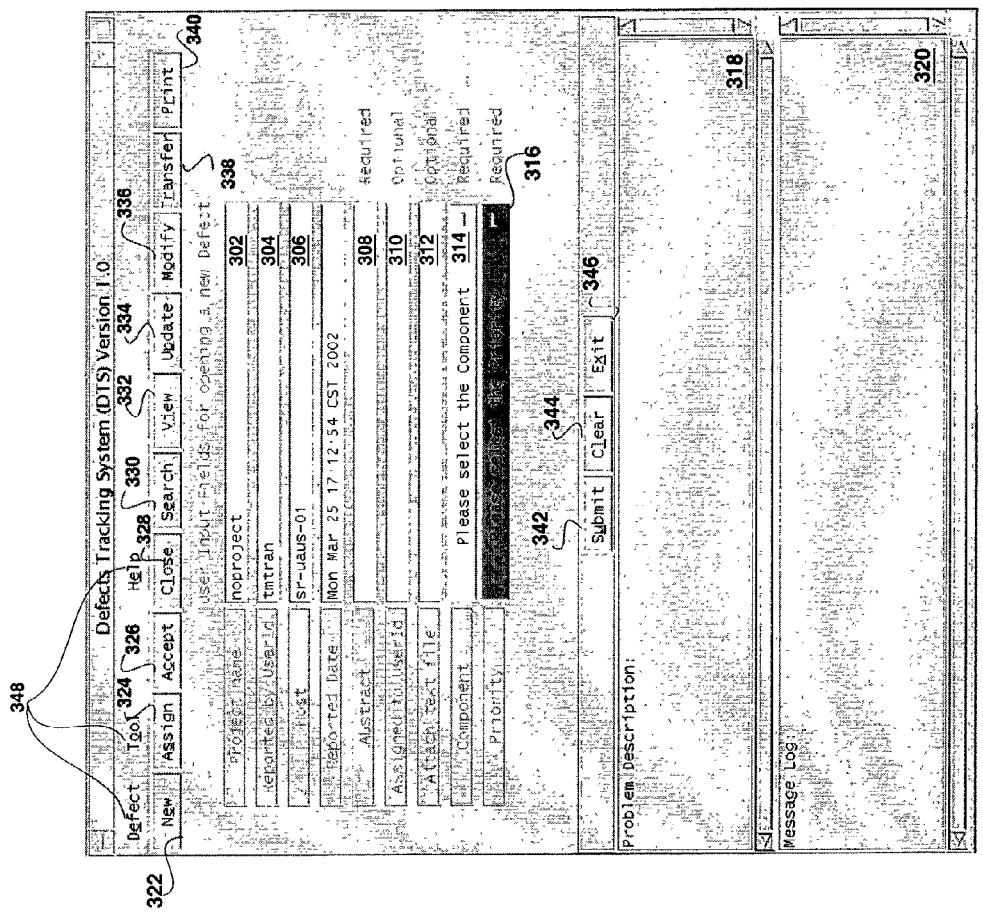
FIG. 3 illustrates an exemplarily tool 300 in accordance with an embodiment of the present invention.

FIG. 3 illustrates an exemplarily tool 300 in accordance with an embodiment of the present invention. The tool 300 may in some embodiments be used to help mask designers, project managers, or more generally a user in recording and tracking defects. It is envisioned that each defect may be assigned to an engineer. As illustrated the tool 300 includes a project name field 302 (identifying the project name), a reported by user field 304 (identifying the user who reports a defect), a host field 306 (identifying the host computer of a user, which in certain embodiments may be used for electronic mail and/or replicated generation), an abstract field 308 (for inputting abstract information regarding the defect, which may in an embodiment be a required field), and an assigned to user field 310 (identifying the user assigned to a defect, which may be an optional field in an embodiment).

The tool 300 may further include an attached text file field 312 (which may be an optional field in an embodiment) for attaching a data file relating to the defect, a component field 314 which may identify the component having the defect (which may be a required field in an embodiment), and a priority field 316 which may indicate the priority of the defect at hand (which may be a required field in an embodiment). It is envisioned that the attached file may contain any type of data including text and/or graphics. The tool 300 can further include a problem description field 318 which may store data about the defect and a message log field 320 which may include logging information about a given defect such as when the defect was reported, any changes thereafter, and alike. In one embodiment, the component field 314 and the priority field 316 may be implemented as selectable lists.

For example, in one embodiment, the component field 314 may be selectable and include any combination of Synthesis, Layout, Schematic, place and route (PR), physical design verification (PDV), Timing, Noise, Simulation, Extraction, Verification, Environment, distributed resource allocation manager (DReAM), Network, central data management system (CDMS), Library, License, computer-aided design (CAD), change request management (CRM), and the like. Additionally, each of the components may be associated with a responsible person, for example, by utilizing the responsible person's identifying indicia such as an Email address, name, telephone number, and the like. Also, in an embodiment the priority field 316 may be selectable and include any combination of highest, high, medium, low, and the like.

The tool 300 may further include a number of buttons such as a new button 322 (e.g., for starting a new input screen for a defect), an assign button 324 (e.g., for assigning the defect to a user), an accept button 326 (e.g., for permitting a user to accept the assignment, per the button 324 in an embodiment), a close button 328 (e.g., for closing a defect), a search button 330 (e.g., for searching the already entered effects), a view button 332 (e.g., for viewing the list of defects), an update button 334 (e.g., for updating the changes made on a given screen), a modify button 336 (e.g., for modifying information about a given defect), a transfer button 338 (e.g., for transferring a defect to a user), a print button 340 (e.g., for printing the displayed information, search results, and alike), a submit button 342 (e.g., for submitting the input information, for example by saving the data input in an embodiment), a clear button 344 (e.g., for clearing the input data in the display fields), an exit button 346 (e.g., for exiting the tool 300). In one embodiment, once the tool has exited, the data entered into the tool is saved to a file. The tool 300 may further include one or more pull-down menus 348 for providing access to, for example, help, defect and/or other types of information.

It is envisioned that in various embodiments different types of screens may be utilized for performing tasks associated with the defect tracking discussed with respect to FIG. 3. For example, a user input screen for assigning a defect may include one or more fields such as: project name, reported by user identity (ID), host, reported date, defect number, assigned to user ID, and the like. Such a screen may further include a remark section and a message log field. In an embodiment, it is envisioned that the buttons 322–346 of FIG. 3 may be present in any further screens associated with the tool 300. Furthermore, in another embodiment, a user input screen for accepting a defect may include one or more fields such as: project name, reported by user ID, host, reported date, defect number, remarks, message log, and the like. A screen for user inputs for closing a defect, in an embodiment, may include one or more of the following fields: project name, reported by user ID, host, reported date, defect number, close reason (which may include a selectable listing), remarks field, message log, and the like. In one embodiment, a user setup screen may include one or more of the following fields: project name, reported by user ID, host, reported date, and the like. In a further embodiment, a screen for user inputs to modify a defect may include one or more of the following fields: project name, reported by user ID, host, reported date, defect number, abstract, component, priority, remarks, message log, and the like.

In another embodiment, a user input screen for printing a defect may include one or more of the following fields: project name, reported by user ID, host, reported date, defect number, printer, remarks, message log, and the like. In yet another embodiment, a screen for user inputs to search defects may include one or more of the following fields: project name, reported by user ID, host, reported date, defect number, assigned to user ID, component, status, priority, report name, remarks, message log, and the like. A screen for user inputs to transfer the defect name, in an embodiment, may include one or more of the following fields: project name, report by user ID, host, reported date, defect number, component, remarks, message log, and the like. A screen for user input to update a defect may include one or more of the following fields: project name, reported by user ID, host, reported date, defect number, update reason (which may implemented as a selectable list), remarks, message log, and the like. A screen for user inputs to view a defect may include one or more of the following fields: project name, reported by user ID, host, reported date, defect number, remarks, message log, and the like. In an embodiment, the tool 300 may be implemented utilizing a computer system such as that discussed with respect to FIG. 2.

Figure 4:
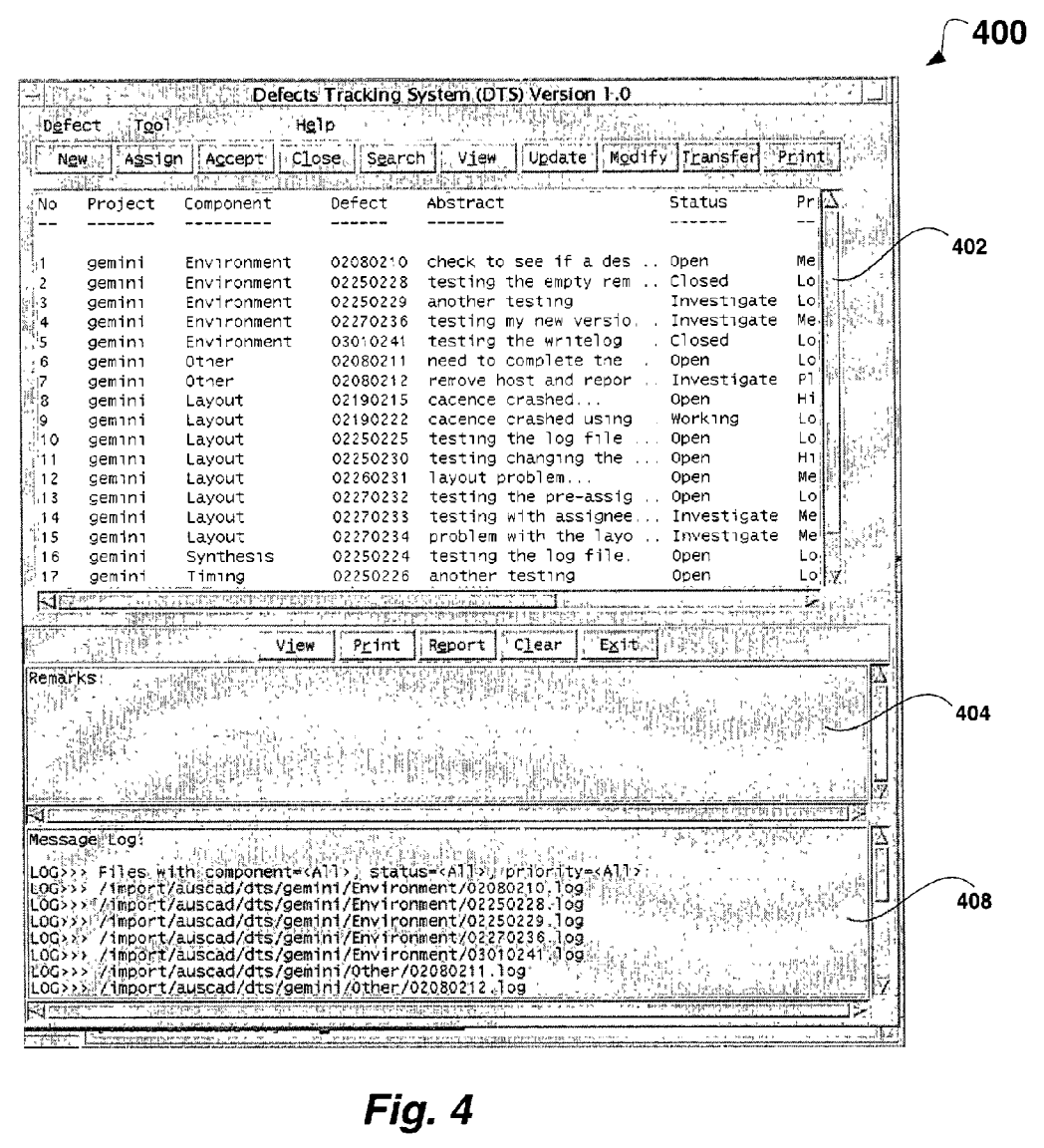

FIG. 4 illustrates an exemplarily tool 400 in accordance with an embodiment of the present invention. The tool 400 may include similar buttons and/or pull-down menus such as those discussed with respect to FIG. 3. The tool 400 includes an output field 402, a remarks section field 404, and a message log field 408. The output field 402 is envisioned to display search results regarding defects of interest such as the defect number, project, component, abstract, status, priority, and the like (including those discussed with respect to FIG. 3, for example). The remarks section 404 may include data input by a user for viewing by other users or for future referral purposes, for example. The message log field 408 may include information about where log information is stored (e.g., in which file). Additionally, the status field discussed herein (e.g., with respect to FIGS. 3 and 4) may be indicated by any combination of the following: open, closed, working, investigate, and the like.

Figure 5:
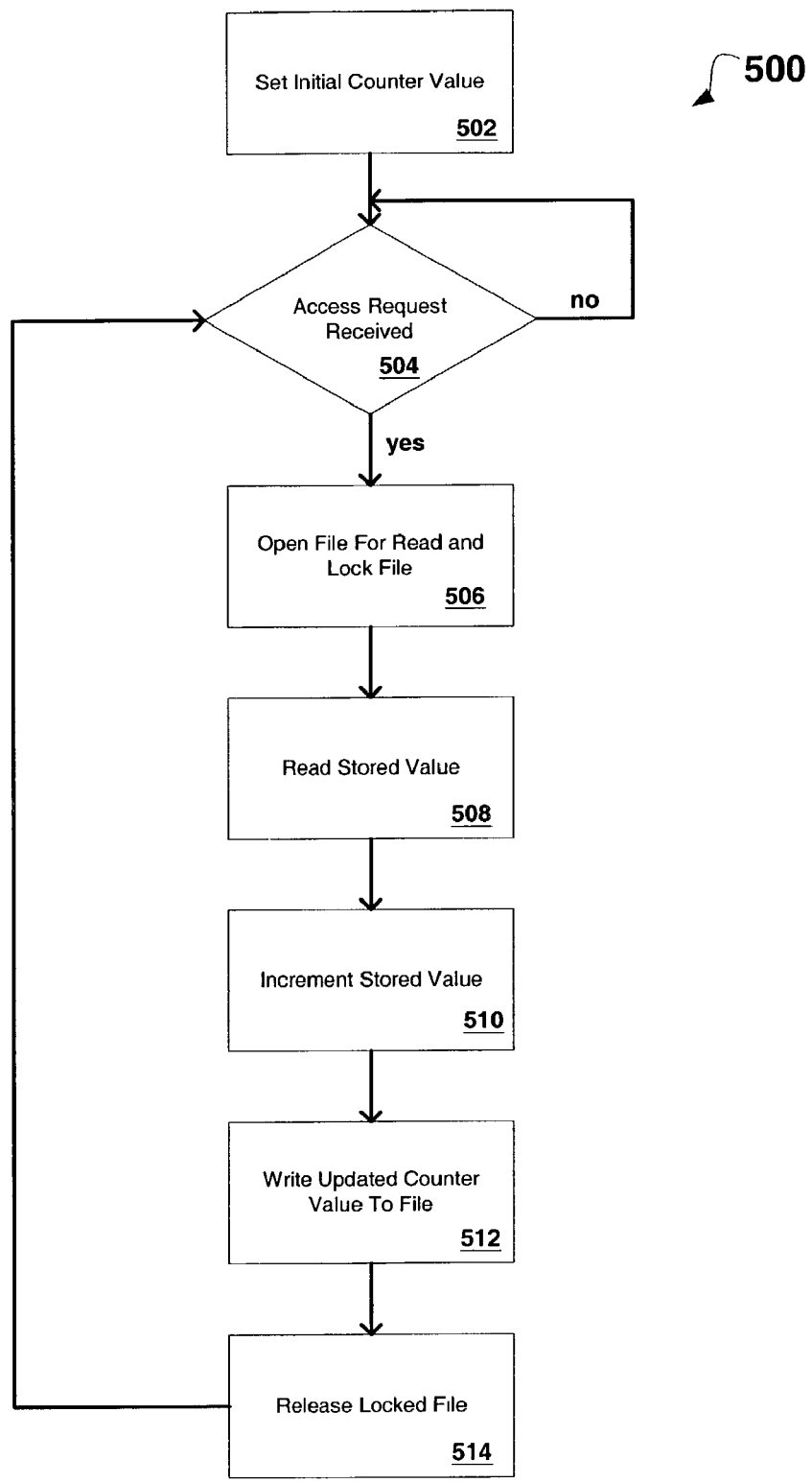
FIG. 5 illustrates an exemplarily method 500 in accordance with an embodiment of the present invention.

FIG. 5 illustrates an exemplarily method 500 in accordance with an embodiment of the present invention. It is envisioned that the method 500 may provide a unique defect number for the defect-tracking tool discussed with respect to FIGS. 3 and/or 4. In a stage 502, the initial value for a counter is set. It is envisioned that in an embodiment the counter value may be stored in a file on a server that may be replicated for disaster recovery and reliability purposes. In a stage 504, it is determined whether an access request has been received. If no access request has been received, the method 500 resumes at the stage 504. Once an access request is received in the stage 504, a stage 506 opens the file to read and locks the file so that other users may not write to the file at the same time. Next, at a stage 508, the stored value is read from the file. The value read from the file in the stage 508 may be utilized to assign a new defect number for a given defect input in accordance with the discussion of FIG. 3.

In a stage 510, the stored value is incremented, the incrementation may be done by one, two, or any other suitable number. For example, if odd or even numbers are desired the incrementation may be done by two in the stage 510. In a stage 512, the updated counter value is written to the file that was opened in the stage 506. In a stage 514, the file that was locked in a stage 506 may be released such that other users may access the same file. Thereafter, the method 500 resumes in the stage 504. It is envisioned that the file discussed with respect to FIG. 5 may also store information regarding the user who is modifying the file and the time when the file was modified (e.g., through an Email address, telephone number, name, a time stamp, and the like). Accordingly, it can be relatively quickly determined how often the file and/or a Web site are accessed. It is also envisioned that the stage 502 may set the initial value of the counter to one in an embodiment.

The foregoing description has been directed to specific embodiments. It will be apparent to those with ordinary skill in the art that modifications may be made to the described embodiments, with the attainment of all or some of the advantages. For example, the techniques of the present invention may be applied to any type of tracking system utilized for project management, layout tracking, and the like. Therefore, it is the object of the appended claims to cover all such variations and modifications as come within the spirit and scope of the invention.

What is claimed is:

1. A method of tracking a defect, the method comprising:
providing a defect abstract including information to identify the defect;
identifying a component having the defect;
assigning a user to resolve the defect; and
assigning a unique defect number to identify the defect by associating a counter value with the defect.

2. The method of claim 1 wherein the counter value is stored in a file replicated on a different computer system.

3. The method of claim 1 further including providing a status of the defect selected from a group comprising open, closed, working, and investigate.

4. The method of claim 1 further including providing a priority for the defect to prioritize a resolution of the defect compared with a plurality of other defects.

5. The method of claim 1 further including providing a project name corresponding to a component having the defect.

6. The method of claim 1 wherein the counter value increments by one after the unique defect number is assigned to the defect.

7. The method of claim 1 wherein the component is selected from a group comprising Synthesis, Layout, Schematic, PR, PDV, Timing, Noise, Simulation, Extraction, Verification, Environment, DReAM, Network, CDMS, Library, License, CAD, and CRM.

8. The method of claim 1 wherein the component with the defect is an IC component.

9. A system for tracking a defect, the system comprising:
a defect abstractor to provide information to identify the defect;
an identifier to identify a component having the defect;
a resolution assigner to assign a user to resolve the defect; and
a defect number assigner to assign a unique defect number to identify the defect by associating a counter value with the defect.

10. The system of claim 9 wherein the counter value is stored in a file replicated on a different computer system.

11. The system of claim 9 further including a status facility to provide a status of the defect selected from a group comprising open, closed, working, and investigate.

12. The system of claim 9 further including a prioritizing facility to provide a priority for the defect to prioritize a resolution of the defect compared with a plurality of other defects.

13. The system of claim 9 further including a naming facility to provide a project name corresponding to a component having the defect.

14. The system of claim 9 wherein the counter value increments by one after the unique defect number is assigned to the defect.

15. The system of claim 9 wherein the component is selected from a group comprising Synthesis, Layout, Schematic, PR, PDV, Timing, Noise, Simulation, Extraction, Verification, Environment, DReAM, Network, CDMS, Library, License, CAD, and CRM.

16. The system of claim 9 wherein the component with the defect is an IC component.

17. An article of manufacture for tracking a defect, the article comprising:
a machine readable medium that provides instructions that, if executed by a machine, will cause the machine to perform operations including:
providing a defect abstract including information to identify the defect;
identifying a component having the defect;
assigning a user to resolve the defect; and
assigning a unique defect number to identify the defect by associating a counter value with the defect.

18. The article of claim 17 wherein the counter value is stored in a file replicated on a different computer system.

19. The article of claim 17 wherein the component is selected from a group comprising Synthesis, Layout, Schematic, PR, PDV, Timing, Noise, Simulation, Extraction, Verification, Environment, DReAM, Network, CDMS, Library, License, CAD, and CRM.

20. The article of claim 17 wherein the component with the defect is an IC component.

* * * * *